United States Patent [19]

Motooka et al.

[11] Patent Number: 5,055,248

[45] Date of Patent: Oct. 8, 1991

[54] PROCESS FOR PRODUCING STRETCHED ARTICLE OF ULTRAHIGH-MOLECULAR WEIGHT POLYETHYLENE

[75] Inventors: Masanori Motooka; Hotishi Mantoku, both of Iwakuni; Kazuo Yagi, Ohtake; Hiroyuki Takeda, Ohno; Kazuyuki Takimoto, Mikawa, all of Japan

[73] Assignee: Mitsui Petrochemical Industries, Ltd., Tokyo, Japan

[21] Appl. No.: 423,592

[22] Filed: Oct. 16, 1989

Related U.S. Application Data

[63] Continuation of Ser. No. 053,534, May 22, 1987, abandoned, which is a continuation of Ser. No. 734,915, May 16, 1985, abandoned.

[30] Foreign Application Priority Data

| May 16, 1984 [JP] | Japan | 59-96587 |
| Jun. 22, 1984 [JP] | Japan | 59-127469 |

[51] Int. Cl.$^5$ .................. D01F 6/04; D01D 5/12
[52] U.S. Cl. ................ 264/210.3; 264/210.4; 264/210.6; 264/210.7; 264/210.8; 264/211.15; 264/211.16; 264/211.22
[58] Field of Search .............. 526/532; 264/203, 205, 264/210.6, 210.7, 210.8, 290.5, 211.21, 211.22, 210.4, 210.3, 211.15, 211.16

[56] References Cited

U.S. PATENT DOCUMENTS

| 3,017,238 | 1/1962 | Levine et al. | 264/203 |
| 3,219,728 | 11/1965 | Joris et al. | 525/198 |
| 4,381,376 | 4/1983 | Albee, Jr. et al. | 525/367 |
| 4,412,040 | 10/1983 | Albee, Jr. et al. | 525/143 |
| 4,436,689 | 3/1984 | Smith et al. | 264/103 |
| 4,487,875 | 12/1984 | Nakajima et al. | 524/385 |
| 4,487,875 | 12/1984 | Nakajima et al. | 264/211 |
| 4,545,950 | 10/1985 | Motooka et al. | 264/210.6 |
| 4,545,950 | 10/1985 | Motooka et al. | 264/210.6 |
| 4,603,172 | 7/1986 | Albee et al. | 525/143 |
| 4,612,148 | 9/1986 | Motooka et al. | 264/49 |

FOREIGN PATENT DOCUMENTS

| 0115142 | 8/1984 | European Pat. Off. |
| 37-9765 | 7/1962 | Japan. |
| 57-17736 | 1/1982 | Japan. |
| 57-193319 | 11/1982 | Japan. |
| 1037183 | 7/1966 | United Kingdom. |
| 1078738 | 8/1967 | United Kingdom. |
| 1100497 | 1/1968 | United Kingdom. |
| 1246222 | 9/1971 | United Kingdom. |
| 1404544 | 9/1973 | United Kingdom. |
| 2042414 | 9/1980 | United Kingdom. |
| 2051667 | 1/1981 | United Kingdom. |

*Primary Examiner*—Hubert C. Lorin
*Attorney, Agent, or Firm*—Sherman & Shalloway

[57] ABSTRACT

Stretched articles of ultrahigh-molecular-weight polyethylene are prepared by melt-kneading a mixture of ultrahigh-molecular-weight polyethylene with an aliphatic compound ($b_1$) of at least 8 carbon atoms having a melting point of at least 10° C. and a boiling point of at least 130° C. in a screw extruder while maintaining the mixture at a temperature from the melting point of the mixture to 300° C. The molten mixture is melt-extruded through a die at a temperature from the melting point of the mixture to 300° C. and the resulting unstretched extrudate is cooled to solidify it. The unstretched solidified extrudate is then subjected to a stretching treatment at a temperature of the melting point of the aliphatic compound ($b_1$) to a point 20° C. above the melting point of the mixture at a particular stretch ratio.

15 Claims, No Drawings

PROCESS FOR PRODUCING STRETCHED ARTICLE OF ULTRAHIGH-MOLECULAR WEIGHT POLYETHYLENE

This application is a continuation of application Ser. No. 07/053,534 filed May 22, 1987 now abandoned which is a continuation of Ser. No. 06/734,915, filed May 16, 1985, now abandoned.

This invention relates to a process for producing stretched articles of ultrahigh-molecular-weight polyethylene, such as stretched filaments, strands, fibers, films, sheets, tapes and the like. Particularly, it relates to a process by which stretched shaped articles of ultrahigh-molecular-weight polyethylene having high tensile strength and modulus of elasticity and a high quality of excellent uniformity and reproducibility and being substantially free from stretching unevenness can be produced easily with industrial advantage and excellent productivity by using a screw extruder.

More specifically, this invention relates to a process for producing a stretched article of ultrahigh-molecular-weight polyethylene, which comprises (1) melt-kneading a mixture composed of
  (A) 15 to 80 parts by weight, per 100 parts by weight of components (A) and (B) combined, of ultrahigh-molecular-weight polyethylene having an inherent viscosity $[\eta]$, determined at 135° C. in decalin, of at least 5 dl/g, and
  (B) 85 to 20 parts by weight, per 100 parts by weight of components (A) and (B) combined, of an aliphatic compound ($b_1$) of at least 8 carbon atoms having a melting point, determined by the DSC method, of at least 10° C. and a boiling point of at least 130° C. and selected from the group consisting of aliphatic carboxylic acids, aliphatic alcohols, aliphatic acid amides, aliphatic carboxylic acid esters, aliphatic mercaptans, aliphatic aldehydes and aliphatic ketones, wherein up to 80% by weight of the aliphatic compound ($b_1$) may be replaced by a low softening point hydrocarbon polymer ($b_2$) having a softening point, determined by the method of JIS K-2531, of not more than 130° C. and a weight average molecular weight ($\overline{MW}$), determined by the GPC method, of not more than 2,000.

in a screw extruder while maintaining the mixture at a temperature ranging from the melting point, determined by the DSC method, of the mixture to 300° C., (2) melt-extruding the molten mixture through a die kept at a temperature ranging from the melting point, determined by the DSC method, of the mixture to 300° C., (3) cooling the resulting unstretched extrudate to solidify it, and (4) subjecting the unstretched solidified extrudate to a stretching treatment at a temperature ranging from the melting point, determined by the DSC method, of component (B) to a point 20° C. above the melting point of the mixture at a stretch ratio of either at least about 3:1 when step (2) is carried out while a draft is applied to the unstretched extrudate or at least about 10:1 when step (2) is carried out in the absence of a draft.

Ultrahigh-molecular-weight polyethylene is known and commercially available, and has superior impact strength, abrasion resistance, chemical resistance and tensile strength to general-purpose polyethylenes. It has found wider applications as engineering plastics. Since, however, it has a much higher melt viscosity than general-purpose polyethylenes and poor flowability, it is quite difficult, both in respect of the shaping operation and the quality and properties of the resulting shaped articles, to provide practical shaped articles by extrusion molding or injection molding. In the prior art, therefore, ultrahigh-molecular-weight polyethylene is shaped exclusively by compression molding means such as ram extrusion, and extrusion molding means having high productivity cannot be employed As an exception, only rod-like shaped articles are formed from it by extrusion molding at very low speeds.

For the stretching of monofilaments of high-density polyethylene at high stretch ratios, there were proposed, for example, a method which comprises preparing a dispersion of polyethylene in a high concentration by incorporating 20 to 150%, based on the weight of polyethylene, of an additive having a high boiling point higher than the melting point of polyethylene, forming a primary fibrous material from the dispersion, and hot-stretching it to 3 to 15 times its original length while leaving 5 to 25%, based on the as-spun fibrous material, of the additive therein (Japanese Patent Publication No. 9765/1962) and a method which comprises spinning a solution of linear polyethylene having a molecular weight of at least 400,000, and stretching the filaments at a temperature at which the modulus of the filaments reaches at least 20 GPa (Japanese Laid-Open Patent Publication No. 15408/1981 corresponding to British Patent No. 2,051,667).

In these previously proposed methods, ultra-high-molecular-weight polyethylene is dispersed or dissolved in a solvent such as dichlorobenzene, chlorobenzene, nitrobenzene, xylene, solvent naphtha, octane, nonane, decane, toluene, naphthalene, decalin, or tetralin, and spun by specified methods.

When an attempt is made to use such a liquid solvent as a stretchability improver for ultrahigh-molecular-weight polyethylenes in continuous extrusion spinning from a screw extruder, the solvent and the powdery polyethylene cannot at all be mixed because of an excessively great difference in viscosity between the solvent and the powder. Moreover, since the solvent acts as a lubricant between the powder and the screw, the powder and the screw revolve together and extrusion becomes practically impossible. Even if extrusion can be effected, the extrudate cannot be stretched at all because it is not a uniform mixture. Furthermore, it is impossible to perform melt extrusion spinning continuously by a screw extruder. These solvents have relatively low boiling points and high flammability, and are dangerous to use in a screw extruder adapted to be electrically heated.

As a different technique, Japanese Laid-Open Patent Publication No. 17736/1982 (published Oct. 30, 1982) discloses the use of a relatively low-molecular-weight polyethylene as a moldability improver. This patent document proposes a composition composed of 100 parts by weight of ultrahigh-molecular-weight polyethylene having a molecular weight of at least 1,000,000 and 10 to 60 parts by weight of low-molecular-weight polyethylene having a molecular weight of 5,000 to 20,000 in order to improve the moldability of the ultrahigh-molecular-weight polyethylene. The molecular weight of the low-molecular-weight polyethylene in this proposal, however, is too high to be suitable for melt-kneading and extrusion molding by a screw extruder. In fact, a ram-extrusion type compression molding means is employed in this patent document. Naturally, this patent document does not at all refer to melt extrusion under a draft nor the stretching of the melt-extrudate.

A technique relying on extrusion molding is known from Japanese Laid-Open Patent Publication No. 193319/1982 (published on Nov. 27, 1982). This patent document states that a compression molding method has been employed industrially for the molding of ultrahigh-molecular-weight polyethylene; extrusion molding having high productivity is scarcely employed for the molding of ultrahigh-molecular-weight polyethylene; and that attempts are made to perform extrusion molding by using a special extruder, but only thick sheets having a narrow width can be obtained at very slow molding speeds and the molded aticles have a rough surface and much reduced abrasion resistance. In order to overcome these defects, this patent document proposes a process for producing a sheet of ultrahigh-molecular-weight polyethylene, which comprises extrusion-molding a composition composed of 100 parts by weight of ultra-high-molecular-weight polyethylene having a molecular weight of at least 1,000,000 and 20 to 70 parts by weight of at least one normally solid flow-ability improver selected from the group consisting of aliphatic compounds and alicyclic compounds and having a shear stress, determined by a Koka-type flow tester (with a nozzle having a diameter of 1 mm and a length/diameter ratio of 5) at a temperature of 180° C. and a shear speed of 30 sec$^{-1}$, of $8 \times 10^5$ dyne/cm$^2$ to $4 \times 10^6$ dyne/cm$^2$ at a resin temperature of 160° to 250° C. and a shear speed of 1 to 30 sec$^{-1}$, thereby forming a sheet having a width (W) of at least 200 mm and a width (W)/thickness (T) ratio (W/T) of at least 150.

Examples of the normally solid flowability improver shown in this patent document include aliphatic hydrocarbons such as paraffin waxes and low-molecular-weight polyethylene having a molecular weight of about 1,000 to 10,000, alicyclic hydrocarbons such as cyclopentene, cyclopentadiene, cyclohexene-type polymers and polymers of C$_2$ fractions in petroleum refining, higher alcohols having at least 15 carbon atoms such as cetyl alcohol and stearyl alcohol, and aliphatic esters such as butyl oleate.

This proposal, however, does not include any technical idea of providing stretched articles such as stretched films or filaments having high tensile strength and modulus of elasticity and being free from stretching unevenness. On the contrary, it is quite silent on the stretching of the molten extrudate of ultrahigh-molecular-weight polyethylene. In its working examples, polyethylene wax or a mixture of polyethylene wax with a DCPD-type petroleum resin or stearyl alcohol is used as the flowability improver and the polyethylene used has a molecular weight of 2,000 to 9,000. Furthermore, this patent document does not at all refer to extrusion molding under a draft.

European Laid-Open Patent Publication 0115,192 A2 (Aug. 8, 1984) (corresponding to Japanese Patent Applications Nos. 227447/1982 and 59976/1983 laid open on July 26, 1984 and Oct. 24, 1984, respectively) which was published after the Convention priority date of the present application and of which inventorship partly overlaps that of the present application discloses a process for producing a stretched article of ultrahigh-molecular-weight polyethylene, which can overcome the technical defects or disadvantages of the prior art described above.

This process comprises (1) melt-kneading a mixture composed of (A) 15 to 80 parts by weight, per 100 parts by weight of the components (A) and (B) combined, of ultrahigh-molecular-weight polyethylene having an inherent viscosity [$\eta$], determined at 135° C. in decalin, of at least 5 dl/g, preferably at least 7 dl/g and (B) 85 to 20 parts by weight, per 100 parts by weight of the components (A) and (B) combined, of a paraffinic wax having a melting point, determined by the DSC method, of 40 to 120° C. and a weight average molecular weight ($\overline{M}w$), determined by the GPC method, of at least 230 but less than 2,000, preferably less than 1,000, in a screw extruder while maintaining the temperature of the mixture at 180 to 280° C., (2) melt-extruding the molten mixture through a die kept at a temperature of 180 to 300° C., (3) cooling the resulting unstretched extrudate to solidify it, and (4) subjecting the unstretched solidified extrudate to a stretching treatment at a temperature of 60 to 140° C. at a stretch ratio of at least about 3 when step (2) is carried out while a draft is applied to the unstretched extrudate or at a stretch ratio of at least about 10 when step (2) is carried out in the absence of a draft.

The present inventors made investigations in order to develop a process for producing stretched articles such as stretched filaments, films or the like of ultrahigh-molecular-weight polyethylene by using an industrially advantageous screw extruder.

These investigations have led to the discovery that stretched shaped articles of ultrahigh-molecular-weight polythylene having high tensile strength and modulus of elasticity and a high quality of excellent uniformity and reproducibility and being substantially free from stretching unevenness can be produced easily with industrial advantage and excellent productivity by a process in which the aforesaid component (B), i.e. either (b$_1$) or (b$_1$)+(b$_2$), which differs from the paraffinic wax as component (B) specified in the above-cited prior application, is used.

It is an object of this invention therefore to provide a process for producing stretched articles of ultrahigh-molecular-weight polyethylene which have excellent properties and have not been provided heretofore.

The above and other objects and advantages of this invention will become apparent from the following description.

The ultrahigh-molecular-weight polyethylene and a method for its production are known, and such polyethylene is commercially available.

The ultrahigh-molecular-weight polyethylene (A) used in this invention has an inherent viscosity [$\eta$], determined at 135° C. in decalin, of at least 5 dl/g, for example 5-30 dl/g, preferably at least 7 dl/g, particularly 7 to 30 dl/g. When the inherent viscosity of the polyethylene is less than 5 dl/g, a stretched article having excellent tensile strength cannot be obtained by stretching the unstretched solidified extrudate. There is no particular restriction on the upper limit of the inherent viscosity, but the upper limit is preferably 30 dl/g as exemplified above. If the inherent viscosity of the polyethylene is too high beyond 30 dl/g, the melt-spinnability of a mixture of such polyethylene and the component (B) in a screw extruder at the melt-kneading and extruding temperatures specified by the process of this invention tends greatly to be reduced. The use of ultrahigh-molecular-weight polyethylene having an inherent viscosity of up to 30 dl/g is preferred.

The term "ultrahigh-molecular-weight polyethylene", as used in the present application, denotes not only a homopolymer of ethylene but also a copolymer of ethylene with up to 5% by weight of an alpha-olefin having at least 3 carbon atoms, preferably an alpha-olefin having 3 to 8 carbon atoms, such as propylene, butylene, pentene, hexene, 4-methyl-1-pentene, or octene.

The component (B) used in this invention is an aliphatic compound ($b_1$) with at least 8 carbon atoms having a melting point, determined by the DSC method, of at least 10° C., for example 10 to 120° C., preferably 20° to 120° C., more preferably 40° to 100° C., and a boiling point of at least 130° C., preferably at least 160° C., more preferably at least 190° C., and selected from the group consisting of aliphatic carboxylic acids, aliphatic alcohols, aliphatic acid amides, aliphatic carboxylic acid esters, aliphatic mercaptans, aliphatic aldehydes and aliphatic ketones. If desired, up to 80% by weight of the aliphatic compound ($b_1$) may be replaced by a low softening point hydrocarbon polymer ($b_2$) having a softening point, determined by the method of JIS K-2531, of not more than 130° C. and a weight average molecular weight ($\overline{M}w$), determined by the GPC method, of not more than 2,000.

If a liquid aliphatic compound having a melting point of less than 10° C. is used instead of the aliphatic compound ($b_1$) with at least 8 carbon atoms having a melting point of at least 10° C., the ultrahigh-molecular-weight polyethylene (A) rotates as a unit with the screw, and uniform melt-spinning cannot be carried out.

To avoid rotation of the ultrahigh-molecular-weight polyethylene (A) and the component (B) as a unit with the screw, it is effective to employ means by which they are pre-mixed in, for example, a Henschel mixer at a temperature above the melting point of the component (B) but below the melting point of component (A) to cause the component (A) to absorb the component (B). On the other hand, if the component (B) has a boiling point of less than 130° C., surging may occur within the screw extruder owing to the vaporization of the component (B), or abrupt foaming may occur in the molten extrudate which has left the die orifice.

Preferably, the aliphatic compound $b_1$) meeting the aforesaid melting and boiling point requirements and selected from the aforesaid group has 12 to 50 carbon atoms. The aliphatic compound $b_1$) has a molecular weight of 130 to 2,000, preferably 200 to 800.

Examples of the aliphatic compound $b_1$) include fatty acids such as capric acid, lauric acid, myristic acid, palmitic acid, stearic acid and oleic acid, aliphatic alcohols such as lauryl alcohol, myristyl alcohol, cetyl alcohol and stearyl alcohol, fatty acid amides such as capramide, lauric amide, palmitic amide and stearamide, and fatty acid esters such as stearylacetic acid esters.

Some aromatic hydrocarbon compounds such as naphthalene and dimethylnaphthalene have melting and boiling points within the ranges specified with regard to the aliphatic compounds $b_1$) used in this invention. These aromatic compounds, however, have poor compatibility with the ultrahigh-molecular-weight polyethylene (A), and if they are used in the process of this invention, their dispersion in the polyethylene (A) becomes non-uniform, and it is difficult to stretch the resulting mixture uniformly or at a high stretch ratio.

In the present invention, up to 80% by weight, for example 5 to 80% by weight, of the aliphatic compound ($b_1$) constituting the component (B) may be replaced by a low softening point hydrocarbon polymer ($b_2$) having a softening point, determined by the method of JIS K-2531, of not more than 130° C., for example 50° to 130° C., preferably 50° to 120° C., and a weight average molecular weight ($\overline{M}w$), determined by the GPC method, of not more than 2,000, for example 500 to 2,000, preferably 500 to 1,000.

If the hydrocarbon polymer ($b_2$) has a softening point of more than 130° C., it disperses only unevenly in the ultrahigh-molecular-weight polyethylene (A), and the resulting mixture cannot be stretched uniformly at a high stretch ratio. If its molecular weight exceeds 2,000, the extrudate of the mixture may break when a draft is applied to it before it is cooled and solidified. As a result, a stretched article having a high modulus of elasticity and a high tensile strength cannot be obtained. Moreover, in this case, the excess of the hydrocarbon polymer ($b_2$) cannot be extracted from the stretched article as stated hereinafter. On the other hand, if the hydrocarbon polymer ($b_2$) has a softening point of less than 50° C., it is likely that the resulting mixture cannot be processed in an extruder.

The low softening point hydrocarbon polymer ($b_2$) is a solid amorphous polymer which is used, for example, as a tackifier resin in the fields of adhesive tapes, paints, and hot-melt adhesives. Depending upon differences in monomer sources to be polymerized, examples of this polymer include aliphatic hydrocarbon resins produced from $C_4$ fraction, a $C_5$ fraction or a mixture of these obtained by the cracking of petroleum or naphtha, or isoprene and 1,3-pentadiene in any of these fractions, for example in the $C_5$ fraction, as main raw materials; aromatic hydrocarbon resins produced from styrene derivatives and indenes in a $C_4$ fraction obtained by the cracking of petroleum or naphtha as main raw materials; aliphatic-aromatic copolymerized hydrocarbon resins obtained by copolymerizing a $C_4$ or $C_5$ fraction with a $C_9$ fraction; alicyclic hydrocarbon resins obtained by hydrogenating the aromatic hydrocarbon resins; synthetic terpene hydrocarbon resins having an aliphatic, alicyclic and aromatic structure; terpene hydrocarbon resins obtained by using $\alpha,\beta$-pinene in terpene oil as a main raw material; coumarone-indene hydrocarbon resins produced by using indenes and styrenes in coal tar-derived naphtha as raw materials; low-molecular-weight styrene resins; and rosin-type hydro-carbon resins.

The low softening point hydrocarbon polymer ($b_2$) may contain a minor amount, for example, up to 50% by weight thereof, of a hydrocarbon compound ($b_2'$), particularly a wax, other than the aliphatic compound ($b_1$) and the polymer ($b_2$). Advantageously, the hydrocarbon compound ($b_2'$) has a melting point, determined by the DSC method, of at least 10° C., for example 10° to 120° C., preferably 20° to 120° C., more preferably 40° to 100° C., and a boiling point of at least 130° C., preferably at least 160° C., more preferably at least 190° C. Examples of the hydrocarbon compound ($b_2'$) include n-alkanes having at least 22 carbon atoms such as docosane, tricosane, tetracosane and triacontane or mixtures composed of a major proportion of these n-alkanes with lower n-alkanes; so-called paraffin waxes isolated from petroleum and purified; medium to low pressure polyethylene waxes, high pressure polyethylene waxes and ethylene copolymer waxes which are low-molecularweight polymers obtained by polymerizing ethylene or copolymerizing ethylene with other α-olefins; waxes having a decreased molecular weight obtained by thermal degradation of polyethylenes such as low pressure polyethylene and high pressure polyethylene; oxidized waxes and maleinized waxes obtained by oxidizing the aforesaid waxes or modifying them with maleic acid.

In the present invention, the softening point is determined by the ring-and-ball method set forth in JIS K-2531.

The melting point determined by the DSC method, as referred to in this application, denotes the melting point measured by a differential scanning calorimeter (DSC) in accordance with ASTM D3417.

The weight average molecular weight ($\overline{Mw}$) determined by the GPC method, as referred to in this application, denotes the weight average molecular weight measured by GPC (gel-permeation chromatography) under the following conditions.

Device: Model 150C, made by Waters Co.

Column: TSK GMH-6 (6 mm $\phi \times 600$ mm) made by Toyo Soda Co., Ltd.

Solvent: ortho-dichlorobenzene (ODCB)

Temperature: 135° C.

Flow rate: 1.0 ml/min.

Injecting concentration: 30 mg/20 ml ODCB (the amount injected 400 microliters)

The column elution volume is corrected by the universal method using standard polystyrene made by Toyo Soda Co., Ltd. and Pressure Chemical Co.

In step (1) of the process of this invention, a mixture composed of 15 to 80 parts by weight, preferably 30 to 50 parts by weight, per 100 parts by weight of the components (A) and (B) combined, of the aforesaid component (A) and 85 to 20 parts by weight, preferably 70 to 50 parts by weight, per 100 parts by weight of the components (A) and (B) combined, of the aforesaid component (B) is melt-kneaded in a screw extruder while maintaining the mixture at a temperature ranging from its melting point determined by the DSC method to 300° C.

Consequently, there is obtained a molten mixture of (A) and (B) which can be subsequently melt-extruded with or without applying a draft and after cooling, subjected to a stretching treatment, with little or no unevenness in extrusion and stretching to provide a product having a high quality of excellent uniformity.

The mixture of the polyethylene (A) and the component (B) to be melt-kneaded can be prepared by properly selecting known mixing means such as a Henschel mixer and a V-blender at a temperature of, for example, room temperature to 120° C. It is also possible to prepare the mixture by such means, melt-knead it in a single or multiple screw extruder in the same way as in step (1), then granulate the mixture to form molding pellets and use the molding pellets in step (1) of the process of this invention.

If the amount of the ultrahigh-molecular-weight polyethylene (A) is less than 15 parts by weight, the resulting mixture is difficult to melt-knead uniformly in the screw extruder and obtain a uniform molten mixture. Furthermore, when the resulting mixture is melt extruded in step (2) under a draft, a trouble of breakage of the molded article occurs. The same trouble occurs in the stretching treatment in step (3) to be carried out after the unstretched extrudate has been solidified by cooling. On the other hand, when the proportion of the polyethylene (A) exceeds 80 parts by weight (namely, the proportion of the component (B) is too small), melt-kneading in the screw extruder becomes difficult, and the melt viscosity of the molten mixture becomes unduly high so that melt-extrusion in step (2) becomes difficult. Furthermore, there is a marked roughening of the surface of the resulting unstretched extrudate, and a trouble of breakage of the article occurs during the stretching treatment after solidification and during the melt extrusion under a draft.

In step (1), the melt-kneading in the screw extruder is carried out while the mixture of (A) and (B) is maintained at a temperature ranging from the melting point of the mixture to 300° C., preferably from the melting point to 280° C., more preferably from a point 10° C. higher than the melting point to 250° C. If the temperature is lower than the lower limit specified above, the melt viscosity of the molten mixture is too high so that uniform kneading is difficult. If the temperature is too high, the ultrahigh-molecular-weight polyethylene (A) itself is degraded and unduly reduced in molecular weight, and it is difficult to provide a stretched article having the desired high tensile strength and modulus of elasticity. The temperature of the mixture of (A) and (B) can be measured and determined by the method described in Chapter 10: Experimental Temperature and Pressure Measurement of "Engineering Principles of Plasticating Extrusion" written by Zehev Tadmor and Imrich Klein and published by Robert E. Krieger Publishing Company, Huntington, New York (1978).

There is no particular restriction on the screw extruder used. For example, a single screw extruder, a multiple screw extruder and other various known-types of screw extruders can be used.

When it is desired to know the compatibility of the component (A) with the component (B) in practicing the process of this invention, it is possible, for example, to observe a cross section of the unstretched filament prepared from the mixture under a high magnification scanning electron microscope. Specifically, this can be done as follows:- A blend of equal amounts of the ultrahigh-molecular-weight polyethylene (A) and the component (B) is melt-kneaded and then melt-spun. The resulting unstretched filament is cut by a sharp edge such as a microtome in a direction at right angles to the length of the filament. Thus, a sample of the cross section of the filament is prepared. Separately, the same cross section of the filament is taken, and immersed in a solvent such as hexane, heptane or hot ethanol to extract the component (B). The non-treated and the treated cross sections are then comparatively observed under a scanning electron microscope at a magnification of at least 3,000. Since the component (B) used in this invention has good compatibility with the ultrahigh-molecular-weight polyethylene (A), depressions deeper than 0.1 micron are scarcely observed. When naphthalene, for example, is used instead of the component (B), its dispersion is not good, and numerous depressions deeper than 0.1 micron are observed on the cross section of a filament prepared in the same way as above.

In step (2) of the process of this invention, the molten mixture of (A) and (B) obtained in step (1) is melt-extruded from a die provided at the extrusion end of the extruder and kept at a temperature ranging from the melting point of the mixture to 300° C., preferably from a point 10° C. higher than the melting point to 270° C.

If the temperature of the die is lower than the specified lower limit, the melt-extruding operation becomes difficult, and an attempt to extrude the molten mixture forcibly results in non-uniform extrusion. If the temperature of the die is higher than the above-specified upper limit, the ultrahigh-molecular-weight polyethylene (A) itself is degraded and reduced unduly in molecular weight, and a stretched article having the desired high tensile strength and modulus of elasticity is difficult to obtain.

The die used can be properly selected according to the desired shape of the unstretched extrudate. For example, when a die of the spinneret type is used, filaments or strands can be obtained by melt extrusion. Or a tape, film or sheet can be molded by melt extrusion by using a lip die or a T-die for tapes, films, and sheets.

In the process of this invention, the unstretched extrudate formed as in step (3) is cooled and solidified.

At this time, the as-formed unstretched extrudate before cooling can be melt-extruded as described above under a draft, and this gives better results. Means for applying a draft to the as-formed unstretched extrudate are known, and can be utilized in the process of this invention. A draft can be applied by taking up the extrudate at a higher take-up linear speed than the extrusion linear speed in step (2). According to one embodiment, in subjecting the unstretched extrudate formed by melt extrusion in step (2) to the cooling and solidification treatment in step (3), a drafting action can be exerted on the as-formed unstretched extrudate by taking up its cooled product solidified to such an extent as can be taken up, at a larger take-up linear speed than the melt-extrusion linear speed. For example, as shown in Examples given hereinbelow, an air gap of a suitable desired distance is provided between the melt-extrusion die and a cooling medium, for example, the water surface of a cooling tank containing cold water, for cooling and solidifying the unstretched extrudate extruded from the die, and the unstretched extrudate is taken up by a take-up roll or bar disposed in the cold water and cooled and solidified. By taking up the unstretched extrudate at a larger take-up linear speed than the extrusion linear speed of the molten mixture of (A) and (B) from the die, a drafting action can be exerted on the unstretched extrudate.

When a draft is to be exerted on the unstretched extrudate by melt extrusion in the process of this invention, the draft ratio is more than 1, preferably not less than 2.

In the present invention, the draft ratio denotes the ratio of $v/v_o$ where $v_o$ is the melt-extruding speed of the molten mixture in the die orifice, and v is the take-up speed of the solidified unstretched extrudate.

Cooling and solidification in step (3) of the process of this invention can be carried out by any desired means by which the unstretched extrudate formed by step (2) on which a draft has been, or has not been, exerted as above, can be cooled and solidified. For example, it can be carried out by contacting the extrudate with a gaseous cooling medium such as cooled air or a cooled inert gas, a liquid cooling medium such as cold water, or other suitable cooling media. The cooling temperature is, for example, about $-20°$ C. to about $60°$ C.

In step (4) of the process of this invention, the solidified product obtained in step (3) is subjected to stretching treatment. The solidified unstretched extrudate is subjected to a stretching treatment at a temperature ranging from the melting point of component (B) to a point $20°$ C. above the melting point of the mixture at a stretch ratio of at least about 3:1, for example from 3:1 to 50:1, when the above melt-extrusion is effected while applying a draft to the resulting unstretched extrudate, and at a stretch ratio of at least about 10:1, for example from 10:1 to 100:1 when the melt-extrusion is effected without application of a draft. The stretch ratio can be varied properly depending upon not only the presence or absence of drafting but also the draft ratio, the type of the component (B) used, etc.

The stretching treatment is carried out at a temperature ranging from the melting point of component (B) to a point $20°$ C. above the melting point of the mixture. The melting point of the mixture is that of component (A). The stretching treatment is preferably $60°$ to $160°$ C., more preferably $80°$ to $154°$ C. If the stretching temperature is below the above-specified lower limit, it is difficult to stretch the extrudate at the desired stretch ratio. If, on the other hand, it is higher than the specified upper limit, the ultrahigh-molecular-weight polyethylene (A) becomes too soft and a stretched article having a high modulus of elasticity cannot be obtained although the extrudate can be stretched.

The treatment can be performed at the above temperature by stretching means known per se. For example, in the case of a filament or strand, a pair of godet rolls may be used for example, and the relative linear speed of the godet rolls is properly changed and selected so that stretching is effected at the desired stretch ratio. A film or tape, on the other hand, is stretched by using a pair of snap rolls, for example. Hot stretching may be carried out in an atmosphere of a heat medium, for example in an atmosphere of heated air, steam, a heated liquid, etc. Or it can be carried out by using heat waves or a hot plate. These means may be used in combination.

Preferably, the hot stretching is carried out in an atmosphere of a heat medium. It is especially preferred to use as the heat medium a solvent (liquid medium) which can dissolve the component (B) or remove it by leaching and has a boiling point higher than the stretching temperature employed, preferably a boiling point at least about $10°$ C. higher than the stretching temperature employed. Examples of the liquid medium are decalin, decane and kerosene By employing this preferred embodiment, the excess of the component (B) can be removed by extraction or leaching simultaneously with the stretching treatment, and it becomes possible to reduce unevenness in stretching and perform stretching at a high stretch ratio. Of course, the excess of the component (B) may be removed by other means. For example, it can be achieved by treating the solidified unstretched extrudate with such a solvent as hexane, heptane, hot ethanol, chloroform or benzene prior to the stretching treatment. Or the stretched product may be subjected to a similar solvent treatment.

Fibers having fine pores can be obtained by removing the component (B) such that the amount of the component (B) remaining in the stretched article is not more than about 10% by weight. The modulus of elasticity and tensile strength of such fibers which are determined by a method involving measuring the true cross-sectional area of the fibers on a weight basis do not fall below those of the fibes before extraction of the component (B). This embodiment is therefore preferred.

If in step (4), the stretch ratio in the aforesaid solvent is less than 3:1 in stretching the solidified product of the unstretched extrudate obtained under a draft, it is frequently the case that the tensile strength and the modulus of elasticity of the stretched article increase only to a small extent, and stretching unevenness occurs in the stretched article to degrade its appearance. On the other hand, if in step (4), the stretch ratio in the aforesaid solvent is less than 10:1 in stretching the solidified product of the unstretched extrudate obtained without applying a draft, it is frequently the case that the tensile strength and the modulus of elasticity of the stretched product increase only to a small extent and the polyethylene in the stretched article is whitened to degrade the appearance of the stretched article.

The stretching treatment in step (4) needs not to be performed in one stage. If desired, it can be performed in a multiplicity of stages. When the latter is employed, the stretching temperature at each stage is not particularly restricted as far as they are in the above-specified range. But the stretching temperature at each stage is preferably higher than that in the preceding stage.

As far as the main stretching treatment is employed at temperatures in the above-specified range, an additional stretching treatment can be performed at a temperature higher than the specified upper limit. When the multistage treatment is employed, the stretch ratio specified in step (4) of the process of this invention denotes the total of stretch ratios in the individual stages. The final stretching speed in the stretching treatment is not particularly restricted. But from the viewpoint of productivity, it is preferably at least 3 m/min., more preferably at least 5 m/min. Usually, the stretching is carried out monoaxially in the extruding direction (machine direction). In the case of a film or sheet, the stretching may further be carried out in the transverse direction (biaxial stretching). The stretching in the transverse direction can be carried out under the same conditions as described above except that the stretch ratio is set at 1.5:1 or higher, preferably at 2:1 or higher.

If desired, the stretched articles of ultra-high-molecular-weight polyethylene obtained by the process of this invention may contain other additives. These additives are preferably blended with the polyethylene (A) or the mixture of the polyethylene (A) and the component (B) in step (1). If desired, however, they may be added and mixed during melt-kneading in the screw extruder.

These additives may be various additives convenitonally used for polyolefins, for example heat stabilizers, weatherability stabilizers, coloring agents and fillers. The amounts of these additives blended may be properly selected within the ranges which do not impair the objects of this invention. For example, they are about 0.01 to about 1% by weight for the heat stabilizers, about 0.01 to about 2% by weight for the weatherability stabilizers, and about 0.01 to about 5% by weight for the coloring agents.

Examples of the heat stabilizers are phenolic compounds such as 2,6-di-tert-butyl-4-methylphenol and 2,2-thiobis-(6-tert-butyl-4-methylphenol) and amine compounds such as phenyl-1-naphthylamine.

An example of the weatherability stabilizers is 2-(2-hydroxyphenyl)benzotriazole.

Examples of the coloring agent or fillers are phthalocyanine pigments, nitroso lake pigments, titanium oxide, zinc oxide, precipitated silica, and carbon black.

The stretched articles of ultrahigh-molecular-weight polyethylene obtained by the process of this invention have high tensile strength and modulus of elasticity which cannot be obtained with conventional stretched articles of polyethylene. Accordingly, they can find use as fibers having high tensile strength and modulus of elasticity as well as in conventional applications of stretched articles such as monofilaments and tapes. They can be used as various reinforcing materials which require light weight. Furthermore, by utilizing a high degree of crystal orientation due to stretching at very high ratios and micropores formed secondarily by the extraction of the excess of the component (B), these stretched articles can find applications as various functional materials such as selective membranes and electrets.

The following examples illustrate the present invention more specifically. It should be noted that the invention is not limited to these examples alone unless it departs from the scope herein described and claimed.

Example 1

A 30:70 blend of ultrahigh-molecular-weight polyethylene ($[\eta]=8.20$ dl/g) and stearic acid (melting point=71.5° C., boiling point 232° C./15 mmHg) was melt-spun and stretched under the following conditions.

A powder of the ultrahigh-molecular-weight polyethylene and a powder of stearic acid were mixed, and then melt-kneaded at a resin temperature of 200° C. by a screw extruder having a screw diameter of 20 mm and an L/D ratio of 20. The molten mixture was then extruded from a die having an orifice diameter of 1.0 mm and kept at 190° C. and solidified in air at room temperature with an air gap of 20 cm. The extrusion speed of the molten mixture was 6.0 cm/min, and a draft was applied so that the take-up speed became 6.0 cm/min. (namely, the draft ratio was set at 1). Subsequently, the extruded filament was stretched in a stretching tank (the inside temperature 130° C., the length 40 cm) by two pairs of godet rolls using n-decane as a heat medium.

In the stretching operation, the rotating speed of a first godet roll was adjusted to 0.5 m/min., and the filament was stretched at different stretch ratios by changing the rotating speeds of a second and a third godet roll. First, the filament was stretched at a ratio of 8.0 by the second godet roll, and then further stretched by the third godet roll at a predetermined stretch ratio. The stretch ratio was calculated from the rotation ratio of the godet rolls.

The dynamic moduli of elasticity, tensile moduli of elasticity, tensile strengths and elongations at break of the filaments obtained at different stretch ratios are shown in Table 1.

The dynamic modulus of elasticity was measured at 23° C. and a vibration of 110 Hz by means of a dynamic viscoelasticity measuring instrument (Vibron DDV-II, supplied by Toyo Baldwin Company). The tensile modulus of elasticity, tensile strength and elongation at break were measured at 23° C. by means of an Instron universal tester (MOdel 1123, supplied by Instron Company). At this time, the length of a sample between clamps was adjusted to 100 mm, and the speed of pulling, to 100 mm/min.

The tensile strength was calculated by using the stress measured at 2% strain. The cross-sectional area of the filament, required for the calculation, was determined by measuring the weight and length of the filament assuming that the density of polyethylene was 0.96 g/cm$^3$.

TABLE 1

|  | Stretch ratio | | | | | |
| --- | --- | --- | --- | --- | --- | --- |
|  | 10.5 | 16.8 | 24.6 | 30.7 | 36.1 | 42.5 |
|  | Run No. | | | | | |
|  | 1 | 2 | 3 | 4 | 5 | 6 |
| Dynamic modulus of elasticity (GPa) | 23.4 | 60.5 | 100.3 | 125.2 | 143.1 | 157.2 |
| Tensile modulus of elasticity (GPa) | 6.5 | 18.1 | 33.4 | 45.1 | 56.2 | 63.3 |
| Tensile strength (GPa) | 0.82 | 1.33 | 1.65 | 1.79 | 1.82 | 1.92 |
| Elongation at break (%) | 16.2 | 11.9 | 8.6 | 6.8 | 6.1 | 5.4 |

Example 2

A 30:70 blend of ultrahigh-molecular-weight polyethylene ($[\eta]=8.20$ dl/g) and stearic acid (mp=71.5° C., bp=232° C./15 mmHg) was melt-spun and stretched under the same conditions as in Example 1 except as noted below.

The molten mixture was extruded from a die having an orifice diameter of 1.0 mm and kept at 190° C., and solidified in air at room temperature with an air gap of 20 cm. At this time, the extrusion speed of the molten mixture was 6.0 cm/min., and a draft was applied so that the take-up speed became 1.8 m/min. (namely, the draft ratio was 30). The stretching was carried out at a stretch ratio of 4.0 by the second godet roll, and subsequently the second stretching was carried out by the third godet roll at a predetermined stretch ratio.

Table 2 summarizes the dynamic moduli of elasticity, tensile moduli of elasticity, tensile strength, and elongations at break of the resulting filament at the various stretch ratios. It is seen that by increasing the draft ratio, the stretched filament has a higher tensile strength than those obtained in Example 1.

TABLE 2

|  | Stretch ratio | | | | | |
| --- | --- | --- | --- | --- | --- | --- |
|  | 4.8 | 6.4 | 8.0 | 9.6 | 11.2 | 13.1 |
|  | Run No. | | | | | |
|  | 7 | 8 | 9 | 10 | 11 | 12 |
| Dynamic modulus of elasticity (GPa) | 55.6 | 72.3 | 94.7 | 124.3 | 138.8 | 158.4 |
| Tensile modulus of elasticity (GPa) | 14.3 | 21.5 | 31.0 | 41.6 | 52.2 | 65.5 |
| Tensile strength (GPa) | 1.52 | 1.60 | 1.67 | 2.04 | 2.23 | 2.63 |
| Elongation at break (%) | 11.9 | 8.7 | 6.0 | 6.0 | 5.3 | 4.8 |

Example 3

A 30:70 blend of ultrahigh-molecular-weight polyethylene ($[\eta]=8.20$ dl/g) and stearic acid (mp=71.5° C., bp=232° C./15 mmHg) was melt-spun and stretched under the same conditions as in Example 1 except as noted below.

The molten mixture was extruded from a die having an orifice diameter of 1.0 mm, and solidified in air at room temperature with an air gap of 20 cm. At this time, the extrusion speed of the molten mixture was 6.0 cm/min., and a draft was applied so that the take-up speed became 3.0 m/min. (namely the draft ratio was set at 50). The stretching was carried out at a stretch ratio of 4.0 by the second godet roll, and subsequenctly, the second stretching was carried out at a predetermined stretch ratio by the third godet roll.

Table 3 summarizes the dynamic moduli of elasticity, tensile moduli of elasticity, tensile strengths and elongations at break of the filaments obtained at the various stretch ratios. It is seen that by increasing the draft ratio, the resulting stretched filaments had higher tensile strength than the products obtained in Example 1.

TABLE 3

|  | Stretch ratio | | | | | |
| --- | --- | --- | --- | --- | --- | --- |
|  | 6.4 | 8.6 | 10.5 | 11.6 | 13.2 | 14.5 |
|  | Run No. | | | | | |
|  | 13 | 14 | 15 | 16 | 17 | 18 |
| Dynamic modulus of elasticity (GPa) | 91.5 | 102.5 | 115.3 | 124.3 | 140.5 | 152.3 |
| Tensile modulus of elasticity (GPa) | 24.5 | 29.4 | 40.8 | 38.4 | 56.2 | 61.3 |
| Tensile strength (GPa) | 1.76 | 2.23 | 2.54 | 2.71 | 2.78 | 3.04 |
| Elongation at break (%) | 16.4 | 12.5 | 9.8 | 7.8 | 7.3 | 6.5 |

Example 4

A 30:70 blend of ultrahigh-molecular-weight polyethylene ($[\eta]=8.20$) and myristic acid (mp=58.5° C., bp=199° C./16 mmHg) was melt-extruded and stretched under the same conditions as in Example 1 except as noted below.

The molten mixture was extruded from a die having an orifice diameter of 1 mm, and solidified in air at room temperature with an air gap of 20 cm. At this time, the extruding speed of the molten mixture was 6.0 cm/min., and a draft was applied so that the take-up speed became 1.8 m/min. (namely the draft ratio was set at 30). The stretching was carried out at a stretch ratio of 4.0 by the second godet roll, and subsequently the second stretching was carried out at a predetermined stretch ratio by the third godet roll.

Table 4 summarizes the dynamic moduli of elasticity, tensile moduli of elasticity, tensile strengths and elongations at break of the filaments obtained at the various stretch ratios.

TABLE 4

|  | Stretch ratio | | | | | |
| --- | --- | --- | --- | --- | --- | --- |
|  | 4.8 | 6.4 | 8.0 | 9.6 | 11.2 | 13.1 |
|  | Run No. | | | | | |
|  | 19 | 20 | 21 | 22 | 23 | 24 |
| Dynamic modulus of elasticity (GPa) | 41.0 | 64.5 | 103.1 | 114.3 | 134.7 | 151.8 |
| Tensile modulus of elasticity (GPa) | 9.9 | 18.9 | 33.4 | 42.8 | 51.4 | 61.7 |
| Tensile strength (GPa) | 1.22 | 1.60 | 2.06 | 1.98 | 2.06 | 2.34 |
| Elongation at break (%) | 13.0 | 9.7 | 7.7 | 5.5 | 5.2 | 4.9 |

Example 5

A 30:70 blend of ultrahigh-molecular-weight polyethylene ($[\eta]=8.20$) and stearyl alcohol (mp=59.4° C., bp=210° C./15 mmHg) was melt-spun and stretched under the same conditions as in Example 1 except as noted below.

The molten mixture was extruded from a die having an orifice diameter of 1 mm, and solidified in air at room temperature with an air gap of 20 cm. At this time, the extruding speed of the molten mixture was 6.0 cm/min., and a draft was applied so that the take-up speed became 1.8 m/min. (namely, the draft ratio was set at 30). The stretching was carried out at a stretch ratio of 4.0 by the second godet roll, and subsequently, the second stretching was carried out at a predetermined stretch ratio by the third godet roll.

Table 5 summarizes the dynamic moduli of elasticity, tensile moduli of elasticity, tensile strengths and elongations at break of the filaments obtained at the various stretch ratios.

TABLE 5

|  | Stretch ratio | | | | | |
| --- | --- | --- | --- | --- | --- | --- |
|  | 4.8 | 6.4 | 8.0 | 9.6 | 11.2 | 13.1 |
|  | Run No. | | | | | |
|  | 25 | 26 | 27 | 28 | 29 | 30 |
| Dynamic modulus of elasticity (GPa) | 37.5 | 72.5 | 101.2 | 126.5 | 138.5 | 154.3 |
| Tensile modulus of elasticity (GPa) | 10.1 | 22.4 | 36.1 | 47.8 | 52.2 | 64.5 |
| Tensile strength (GPa) | 1.22 | 1.62 | 1.87 | 2.23 | 2.23 | 2.63 |
| Elongation at break (%) | 12.2 | 8.3 | 6.4 | 5.9 | 5.3 | 5.0 |

Example 6

A 30:70 blend of ultrahigh-molecular-weight polyethylene ($[\eta]=8.20$ dl/g) and myristyl alcohol (mp=38° C., bp=286° C.) was melt-spun and stretched under the same conditions as in Example 1 except as noted below.

The molten mixture was extruded from a die having an orifice diameter of 1 mm, and solidified in air at room temperature with an air gap of 20 cm. At this time, the extruding speed of the molten mixture was 6.0 cm/min., and a draft was applied so that the take-up speed became 1.8 m/min. (namely, the draft ratio was set at 30). The stretching was carried out at a stretch ratio of 4.0 by the second godet roll, and subsequently the second stretching was carried out at a predetermined stretch ratio by the third godet roll.

Table 6 summarizes the dynamic moduli of elasticity, tensile moduli of elasticity, tensile strengths and elongations at break of the filaments obtained at the various stretch ratios.

TABLE 6

|  | Stretch ratio | | | | | |
| --- | --- | --- | --- | --- | --- | --- |
|  | 4.8 | 6.4 | 8.0 | 9.6 | 11.2 | 13.1 |
|  | Run No. | | | | | |
|  | 31 | 32 | 33 | 34 | 35 | 36 |
| Dynamic modulus of elasticity (GPa) | 43.2 | 66.2 | 92.3 | 121.3 | 138.4 | 157.6 |
| Tensile modulus of elasticity (GPa) | 11.4 | 19.9 | 32.5 | 42.9 | 52.7 | 64.3 |
| Tensile strength (GPa) | 1.22 | 1.48 | 1.82 | 1.93 | 2.26 | 2.54 |
| Elongation at break (%) | 11.9 | 8.4 | 6.9 | 5.6 | 5.1 | 4.7 |

Example 7

A 30:70 blend of ultrahigh-molecular-weight polyethylene ($[\eta]=8.20$) and stearic acid (mp=71.5° C., bp-232° C./15 mmHg) was melt-spun and stretched under the same conditions as in Example 1 except as noted below.

The molten mixture was extruded from a die having an orifice diameter of 1 mm, and solidified in air at room temperature with an air gap of 20 cm. At this time, the extruding speed of the molten mixture was 6.0 cm/min., and a draft was applied so that the take-up speed became 1.8 m/min. (namely, the draft ratio was set at 30). The stretching was carried out at a stretch ratio of 4.0 by the second godet roll, and subsequently the second stretching was carried out at a predetermined stretch ratio by the third godet roll. At this time, stearic acid kept at 130° C. was used as a heat medium in the stretching tank. After the stretching, the stretched filament was washed with boiling ethanol to remove the stearic acid adhering to its surface, and then dried.

Table 7 summarizes the dynamic moduli of elasticity, tensile moduli of elasticity, tensile strengths and elongations at break of the filaments obtained at the various stretch ratios.

TABLE 7

|  | Stretch ratio | | | | | |
| --- | --- | --- | --- | --- | --- | --- |
|  | 4.8 | 6.4 | 8.0 | 9.6 | 11.2 | 13.1 |
|  | Run No. | | | | | |
|  | 37 | 38 | 39 | 40 | 41 | 42 |
| Dynamic modulus of elasticity (GPa) | 48.0 | 69.8 | 103.4 | 110.7 | 127.5 | 146.3 |
| Tensile modulus of elasticity (GPa) | 12.3 | 20.7 | 32.4 | 42.3 | 53.1 | 62.7 |
| Tensile strength (GPa) | 1.35 | 1.62 | 1.87 | 2.18 | 2.24 | 2.51 |
| Elongation at break (%) | 13.1 | 9.6 | 7.6 | 6.0 | 5.8 | 5.0 |

Example 8

A 30:70 blend of ultrahigh-molecular-weight polyethylene ($[\eta] = 8.20$ dl/g) and stearyl alcohol (mp = 59.4° C., bp = 210° C./15 mmHg) was melt-spun under the same conditions except as noted below. The molten mixture was extruded from a die having an orifice diameter of 1 mm, and solidified in air at room temperature with an air gap of 20 cm. At this time, the extruding speed of the molten mixture was 6.0 cm/min., and a draft was applied so that the take-up speed become 1.8 m/min. (namely, the draft ratio was set at 30). The stretching was carried out at a stretch ratio of 4.0 by the second godet roll, and subsequently, the second stretching was carried out at a predetermined stretch ratio by the third godet roll. At this time, stearyl alcohol kept at 130° C. was used as a heat medium in the stretching tank. After stretching, the stretched filament was washed with boiling ethanol to remove stearyl alcohol adhering to its surface, and then dried.

Table 8 summarizes the dynamic moduli of elasticity, tensile moduli of elasticity, tensile strengths and elongations at break of the filaments obtained at the various stretch ratios.

TABLE 8

|  | Stretch ratio | | | | | |
| --- | --- | --- | --- | --- | --- | --- |
|  | 4.8 | 6.4 | 8.0 | 9.6 | 11.2 | 13.1 |
|  | Run No. | | | | | |
|  | 43 | 44 | 45 | 46 | 47 | 48 |
| Dynamic modulus of elasticity (GPa) | 41.5 | 60.3 | 92.4 | 107.5 | 129.0 | 153.2 |
| Tensile modulus of elasticity (GPa) | 10.3 | 18.9 | 33.3 | 42.8 | 52.1 | 64.3 |
| Tensile strength (GPa) | 1.22 | 1.50 | 1.81 | 2.03 | 2.29 | 2.27 |
| Elongation at break (%) | 12.1 | 9.6 | 6.4 | 5.2 | 5.7 | 4.8 |

Example 9

A 50:50 blend of ultrahigh-molecular-weight polyethylene ($[\eta] = 8.20$ dl/g) and stearic acid (mp = 71.5° C., bp = 232° C./15 mmHg) was molded into a film through a T-die and then stretched under the following conditions.

A powder of the ultrahigh-molecular-weight polyethylene and a powder of stearic acid were mixed, and then melt-kneaded and pelletized in a screw extruder having a screw diameter of 20 mm and an L/D ratio of 20 at a resin temperature of 180° C. The pellets were then molded into a film by a screw extruder having a screw diameter of 20 mm and an L/D ratio of 20 and equipped with a coat hanger-type die (lip length = 3000 mm, lip thickness = 0.5 mm). The film was adjusted to a width of 300 mm and a thickness of 0.5 mm by using a cold roll cooled by cold water at 20° C. Subsequently, the film was stretched by two pairs of snap rolls in a stretching tank (inside temperature 130° C., length 80 cm) using n-decane as a heat medium.

In the stretching operation, the rotating speed of a first snap roll was adjusted to 0.5 m/min., and the film was stretched at a ratio of 8.0 by a second snap roll, and subsequently, by changing the rotating speed of a third snap roll, stretched tapes having different stretch ratios were obtained. The stretch ratio was calculated from the rotation ratio of the first and third snap rolls.

Table 9 summarizes the dynamic moduli of elasticity, tensile moduli of elasticity, tensile strengths and elongations at break of the films obtained at the various stretch ratios.

TABLE 9

|  | Stretch ratio | | | | | |
| --- | --- | --- | --- | --- | --- | --- |
|  | 10.8 | 15.6 | 23.2 | 30.3 | 35.8 | 41.2 |
|  | Run No. | | | | | |
|  | 49 | 50 | 51 | 52 | 53 | 54 |
| Dynamic modulus of elasticity (GPa) | 33.2 | 45.2 | 64.8 | 90.5 | 96.2 | 110.5 |
| Tensile modulus of elasticity (GPa) | 8.5 | 13.6 | 23.4 | 32.4 | 39.8 | 46.8 |
| Tensile strength (GPa) | 0.72 | 0.96 | 1.21 | 1.37 | 1.54 | 1.80 |
| Elongation at break (%) | 14.3 | 11.5 | 8.1 | 6.8 | 6.5 | 5.9 |

Example 10

A 50:50 blend of ultrahigh-molecular-weight polyethylene ($[\eta] = 8.20$ dl/g) and stearyl alcohol (mp = 59.4° C., bp-210° C./15 mmHg) was molded into a film through a T-die and stretched under the following conditions.

A powder of the ultrahigh-molecular-weight polyethylene and a powder of stearyl alcohol were mixed, and then melt-kneaded and pelletized by a screw extruder having a screw diameter of 20 mm and an L/D ratio of 20 at a resin temperature of 180° C. The pellets were then molded into a film by a screw extruder having a screw diameter of 20 mm and an L/D ratio of 20 and equipped with a coat hanger-type die (lip length = 300, lip thickness = 0.5 mm). The extruded film was adjusted to a width of 300 mm and a thickness of 0.5 mm by using a cold roll cooled by cold water at 20° C. Subsequently, it was stretched by two pairs of snap rolls in a stretching tank (inside temperature 130° C., length 80 cm) using n-decane as a heat medium.

In the stretching operation, the rotating speed of the a first snap roll was adjusted to 0.5 m/min. The film was stretched at a stretch ratio of 8.0 by a second snap roll, and subsequently, by changing the rotating speed of a third snap roll, stretched tapes having different stretch ratios were obtained. The stretch ratio was calculated from the rotation ratio of the first and third snap rolls.

Table 10 summarizes the dynamic moduli of elasticity, tensile moduli of elasticity, tensile strengths and elongations at break of the films obtained at the various stretch ratios.

TABLE 10

| | Stretch ratio | | | | | |
|---|---|---|---|---|---|---|
| | 11.2 | 16.3 | 20.5 | 32.3 | 36.4 | 39.8 |
| | Run No. | | | | | |
| | 55 | 56 | 57 | 58 | 59 | 60 |
| Dynamic modulus of elasticity (GPa) | 35.0 | 52.0 | 56.8 | 92.4 | 98.5 | 105.3 |
| Tensile modulus of elasticity (GPa) | 10.5 | 15.2 | 19.6 | 34.5 | 38.4 | 43.5 |
| Tensile strength (GPa) | 0.76 | 0.92 | 1.08 | 1.48 | 1.61 | 1.67 |
| Elongation at break (%) | 13.6 | 12.0 | 8.6 | 6.6 | 6.7 | 5.6 |

Comparative Example 1

A 50:50 blend of ultrahigh-molecular-weight polyethylene ($[\eta]=8.20$ dl/g) and naphthalene (mp=80.3° C., bp=218° C.) was melt-spun and stretched under the same conditions as in Example 1 except as noted below.

The molten mixture was extruded from a die having an orifice diameter of 2 mm, and solidified in air at room temperature with an air gap of 20 cm. At this time, the extruding speed of the molten mixture was 6.0 cm/min., and the strand was taken up so that the take-up speed became 6.0 cm/min. However, the strand could not be taken up continuously. The resulting strand was fragile, and any continuous strand could not withstand stretching.

Comparative Example 2

A 5:95 blend of ultrahigh-molecular-weight polyethylene ($[\eta]=8.20$ dl/g) and stearic acid (mp=71.5° C., bp-232° C./15 mmHg) was melt-spun and stretched under the same conditions as in Example 1 except as noted below.

The molten mixture was extruded from a die having an orifice diameter of 4 mm and kept at 100° C., and solidified in air at room temperature with an air gap of 20 cm. At this time, the extruding speed of the molten mixture was 6.0 cm/min. The strand was taken up so that the take-up speed became 6.0 cm/min. However, the strand could not be taken up continuously. Furthermore, the resulting strand was brittle, and any continuous strand could not withstand stretching.

Comparative Example 3

A 50:50 blend of ultrahigh-molecular-weight polyethylene ($[\eta]=8.20$ dl/g) and hexyl alcohol (mp=−51.6° C., bp=157° C.) was melt-extruded under the same conditions as in Example 1 except as noted below. The molten mixture was extruded from a die having an orifice diameter of 2 mm. Since the mixture rotated as a unit with the screw in the screw extruder, a uniform molten strand could not be obtained, and thus a uniform stretched filament could not be obtained.

In the stretched filaments and stretched tapes obtained in the foregoing examples, the remaining of the aliphatic hydrocarbon derivatives was not detected by the DSC measurement in accordance with ASTM D3417.

Example 11

A 25:25:50 blend of ultrahigh-molecular-weight polyethylene (Hizex Million® 145M, ($[\eta]=8.20$ dl/g, a trade name for a product of Mitsui Petrochemical Industries, Ltd.), an aliphatic hydrocarbon resin (Hirez® R-100X, a trade name for a product of Mitsui Petrochemical Industries, Ltd.; softening point 71.5° C., molecular weight 1220) and stearic acid (mp=71.5° C., bp=232° C./15 mmHg) was melt-spun and stretched under the following conditions.

Powders of the polyethylene, the aliphatic hydrocarbon resin and stearic acid were mixed, and melt-kneaded at a resin temperature of 200° C. for 20 to 30 minutes in a Brabender plastograph (supplied by Brabender Company, German) equipped with a roller mixer, type 50 (capacity 58 cc). The kneaded mixture was press-formed into a sheet which was then cut into granules. A screw extruder, type 200 (D=¾ inch, L/D=20) was attached to the Brabender plastograph, and the granular product was further melt-kneaded in it at a resin temperature of 200° C. The molten mixture was then extruded through a die having an orifice diameter of 1.0 mm and kept at 190° C., and solidified in air at room temperature with an air gap of 20 cm. At this time, the extruding temperature of the molten mixture was 6.0 cm/min., and a draft was applied so that the take-up speed became 30.0 cm/min. (namely, the draft ratio was set at 5). Subsequently, the extruded filament was stretched by two pairs of godet rolls in a stretching tank (inside temperature 130° C., length 40 cm) using n-decane as a heat medium.

In the stretching operation, the rotating speed of a first godet roll was adjusted to 0.5 m/min., and by changing the rotating speeds of a second and a third godet roll, filaments having different stretch ratios were obtained. Each of the filaments was first stretched at a stretch ratio of 8.0 by the second godet roll at 110° C., and then further stretched at a predetermined stretch ratio by the third godet roll at 130° C. The stretch ratio was calculated from the rotation ratio of the godet rolls.

Table 11 summarizes the dynamic moduli of elasticity, tensile moduli, tensile strengths and elongations at break of the filaments obtained at the various stretch ratios.

The above properties were measured in the same way as in Example 1.

TABLE 11

| | Stretch ratio | | | | |
|---|---|---|---|---|---|
| | 8.0 | 10.0 | 15.0 | 20.0 | 25.0 |
| | Run No. | | | | |
| | 11 | 12 | 13 | 14 | 15 |
| Dynamic modulus of elasticity (GPa) | 21.3 | 35.0 | 71.8 | 100.2 | 108.9 |
| Tensile modulus of elasticity (GPa) | 4.2 | 8.2 | 21.9 | 34.1 | 43.2 |
| Tensile strength (GPa) | 0.40 | 0.65 | 1.26 | 1.44 | 1.65 |
| Elongation at break (%) | 14.0 | 10.3 | 7.1 | 5.1 | 4.6 |

Example 12

A 25:25:50 blend of ultrahigh-molecular-weight polyethylene (Hizex Million® 145M, a trade name for a product of Mitsui Petrochemical Industries, Ltd.; $[\eta]=8.20$ dl/g), an aromatic hydrocarbon resin Petrosin® #100, a trade name for a product of Mitsui Petrochemical Industries, Ltd.; softening point 100° C., molecular weight 1200), and stearic acid (mp=71.5° C., bp=232° C./15 mmHg) was melt-spun and stretched under the same conditions as in Example 11 except as noted below.

The molten mixture was extruded from a die having an orifice diameter of 1.0 mm and kept at 190° C., and solidified in air at room temperature with an air gap of 20 cm. At this time, the extruding speed of the molten mixture was 6.0 cm/min., and a draft was applied so that the take-up speed became 30.0 cm/min. (namely, the draft ratio was set at 5). The filament was stretched first at a stretch ratio of 8.0 by the second godet roll, and then further stretched at a predetermined stretch ratio by the third godet roll.

Table 12 summarizes the dynamic moduli of elasticity, tensile moduli of elasticity, tensile strengths and elongations at break of the filaments obtained at the various stretch ratios.

TABLE 12

| | Stretch ratio | | | | |
|---|---|---|---|---|---|
| | 8.0 | 15.0 | 20.0 | 25.0 | 30.0 |
| | Run No. | | | | |
| | 26 | 27 | 28 | 29 | 30 |
| Dynamic modulus of elasticity (GPa) | 25.2 | 51.2 | 70.6 | 98.3 | 105.7 |
| Tensile modulus of elasticity (GPa) | 5.3 | 13.4 | 22.0 | 34.8 | 40.5 |
| Tensile strength (GPa) | 0.43 | 0.92 | 1.20 | 1.46 | 1.53 |
| Elongation at break (%) | 10.5 | 7.8 | 6.5 | 5.6 | 5.0 |

Comparative Example 4

A 50:50 blend of ultrahigh-molecular-weight polyethylene (Hizex Million® 145M, a trade name for a product of Mitsui Petrochemical Industries, Ltd.; $[\eta]=8.20$ dl/g) and aliphatic hydrocarbon resin (Hi-rez® R-100X, a trade name for a product of Mitsui Petrochemical Industries, Ltd.; softening point 97.0° C., molecular weight 1220) was melt-spun and stretched under the same conditions as in Example 11 except as noted below.

The molten mixture was extruded from a die having an orifice diameter of 1.0 mm and kept at 190° C., and solidified in air at room temperature with an air gap of 20 cm. At this time, the extruding speed of the molten mixture was 6.0 cm/min. However, the mixture rotated as a unit with the screw in the extruder, and a uniform molten strand could not be obtained. Thus, a uniform stretched filament could not be obtained.

Comparative Example 5

A 25:70:5 blend of ultrahigh-molecular-weight polyethylene (Hizex Million® 145M, a trade name for a product of Mitsui Petrochemical Industries, Ltd.; $[\eta]=8.20$ dl/g), an aromatic hydrocarbon resin (Petrosin® #100, a trade name for a product of Mitsui Petrochemical Industries, Ltd.; softening point 100° C., molecular weight 1200) and paraffin wax (mp=69° C., molecular weight=460) was melt-spun and stretched under the same conditions as in Example 11 except as noted below.

The molten mixture was extruded from a die having an orifice diameter of 1.0 mm and kept at 190° C., and solidified in air at room temperature with an air gap of 20 cm. At this time, the extruding speed of the molten mixture was 6.0 cm/min. However, since the mixture rotated as a unit with the screw-type extruder, a uniform molten strand could not be obtained. Thus, a uniform stretched filament could not be obtained.

What is claimed is:

1. A process for producing a stretched filament of ultrahigh-molecular-weight polyethylene, which comprises
   (1) melt-kneading a mixture composed of
      (A) 15 to 50 parts by weight, per 100 parts by weight of components (A) and (B) combined, of ultrahigh-molecular-weight polyethylene having an inherent viscosity ($\eta$), determined at 135° C. in decalin, of at least 5 dl/g, and
      (B) 85 to 50 parts by weight, per 100 parts, by weight of components (A) and (B) combined, of a mixture of 95 to 20% by weight, per 100 parts by weight of components ($b_1$) and ($b_2$) combined, of a fatty acid ($b_1$) selected from the group consisting of capric acid, lauric acid, myristic acid, palmitic acid, stearic acid and oleic acid, and from 5 to 80% by weight, per 100 parts by weight of the fatty acid($b_1$) and component ($b_2$) combined, of a low softening point hydrocarbon polymer ($b_2$) having a softening point, determined by the method of JIS K-2531, of from 50° to 130° C. and a weight average molecular weight ($\overline{M}w$), determined by the GPC method, of from 50 to 2,000, and selected from the group consisting of aliphatic hydrocarbon resins produced from, as main raw materials, a $C_4$ fraction, a C$_5$ fraction or a mixture of these fractions obtained by cracking of petroleum or naphtha, and aromatic hydrocarbon resins produced from, as main raw materials, a C$_9$ fraction or a mixture of these fractions obtained by cracking of petroleum or naphtha, in a screw extruder while maintaining the mixture at a temperature ranging from the melting point, determined by the DSC method, of the mixture to 300° C., (2) melt-extruding the molten mixture through a die kept at a temperature ranging from the melting point, determined by the DSC method, of the mixture to 300° C., (3) cooling the resulting unstretched extrudate to solidify it, and (4) subjecting the unstretched solidified extrudate to a stretching treatment at a temperature ranging from the melting point, determined by the DSC method, of component (B) to a point 20° C. above the melting point of the mixture at a stretch ratio of either at least about 3:1 when step (2) is carried out while a draft is applied to the unstretched extrudate or at least about 10:1 when step (2) is carried out in the absence of a draft, and dissolving the component (B) with a solvent to remove the component (B) before, during or after the stretching treatment, whereby the amount of the component (B) remaining in the stretched filament is not more than about 10% by weight.

2. The process of claim 1 wherein the inherent viscosity of the ultrahigh-molecular-weight polyethylene (A) is 5 to 30 dl/g.

3. The process of claim 1 wherein the low softening point hydrocarbon polymer (b$_2$) has a softening point, determined by the method of JIS K-2531, of from 50° to 120° C. and a weight average molecular weight, determined by the GPC method, of from 500 to 1000.

4. The process of claim 1 wherein in step (1) 30 to 50 parts by weight of the ultrahigh-molecular-weight polyethylene and 70 to 50 parts by weight of the mixture of the aliphatic compound (b$_1$) and the low softening point hydrocarbon polymer (b$_2$) are used, each per 100 parts by weight of the components (A) and (B) combined.

5. The process of claim 1 wherein the melt-kneading step (1) the mixture composed of (A) and (B) is melt-kneaded in a screw extruder while maintaining the mixture at a temperature ranging from a point 10° C. higher than the melting point, determined by the DSC method, of the mixture to 250° C.

6. The process of claim 1 wherein in step (2) the molten mixture is melt-extruded through a die kept at a temperature ranging from a point 10° C. higher than the melting point to 270° C.

7. The process of claim 1 wherein the melt-extruding in step (2) is carried out in the absence of a draft.

8. The process of claim 7 wherein in step (4) the stretching is carried out at a stretch ratio of from about 10:1 to 100:1.

9. The process of claim 1 wherein in step (2) melt-extruding is carried out in the presence of a draft at a draft ratio of not less than 2.

10. The process of claim 9 wherein in step (4) the unstretched solidified extrudate is subjected to a stretching treatment at a stretch ratio of from about 3:1 to 50:1.

11. The process of claim 10 wherein the stretching treatment in step (4) is at a temperature of from 60° C. to 160° C.

12. The process of claim 1 for producing a stretched filamentary article which comprises melt-extruding the molten mixture through a die of a spinnerette.

13. The process of claim 1 wherein the component (B) is dissolved by the solvent during the stretching treatment using a solvent having a boiling point at least 10° C. higher than the stretching temperature.

14. The process of claim 1 which comprises dissolving the component (B) from the unstretched solidified extrudate prior to the stretching treatment of step (4) using a solvent selected from the group consisting of hexane, heptane, hot ethanol, chloroform and benzene.

15. The process of claim 1 which comprises dissolving the component (B) from the stretched article using a solvent selected from the group consisting of hexane, hot ethanol chloroform and benzene.

* * * * *